Oct. 27, 1953    W. E. SABIN ET AL    2,657,010
FENCE POST DRIVER AND PULLER
Filed Oct. 2, 1950    4 Sheets-Sheet 1

INVENTORS
WALTER E. SABIN
LUVERNE E. SABIN
BY Paul, Paul & Moore
ATTORNEYS

Oct. 27, 1953     W. E. SABIN ET AL     2,657,010
FENCE POST DRIVER AND PULLER

Filed Oct. 2, 1950     4 Sheets-Sheet 2

INVENTORS
WALTER E. SABIN
LUVERNE E. SABIN
BY Paul, Paul + Moore
ATTORNEYS

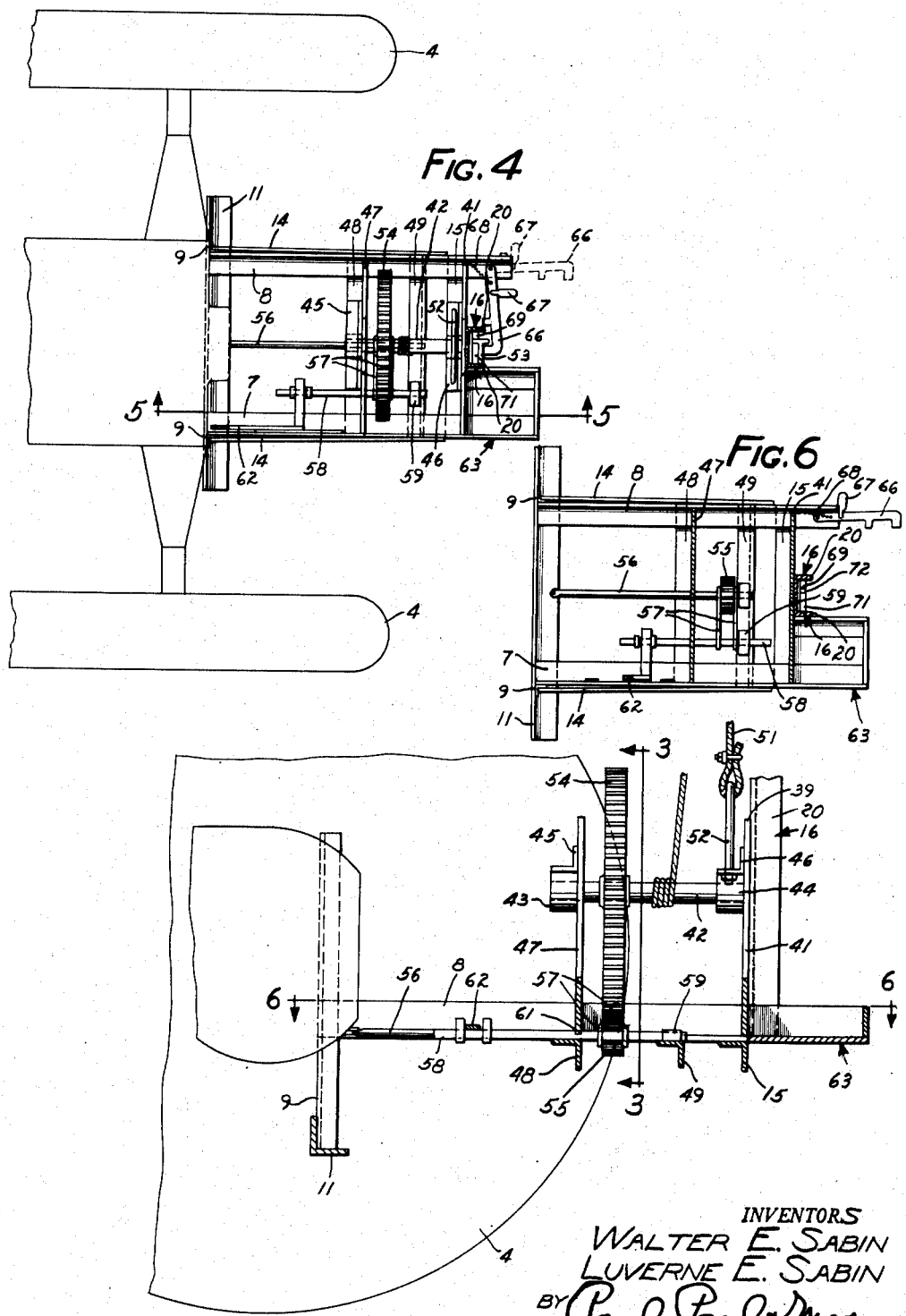

Oct. 27, 1953     W. E. SABIN ET AL     2,657,010
FENCE POST DRIVER AND PULLER
Filed Oct. 2, 1950     4 Sheets-Sheet 4
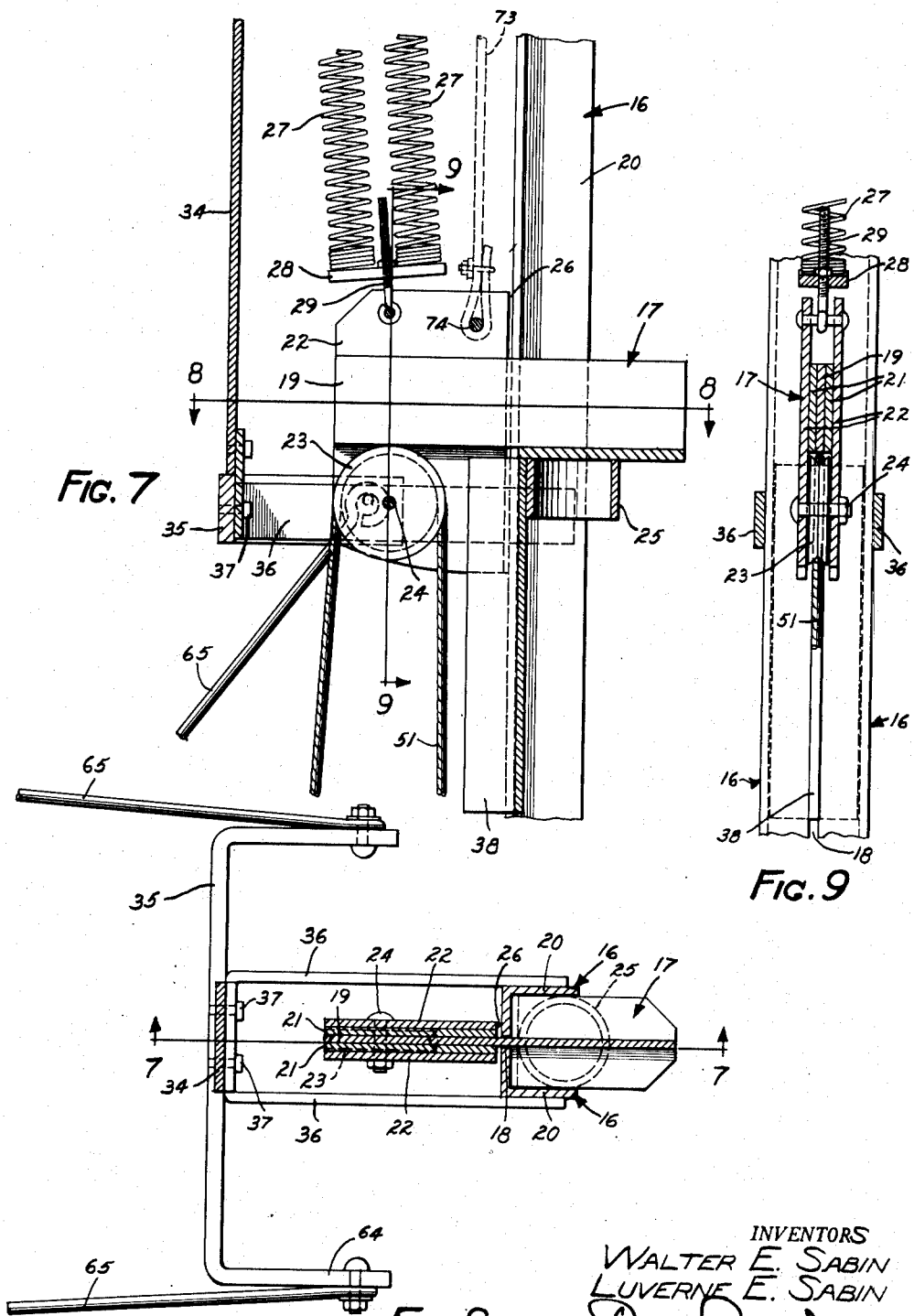

Patented Oct. 27, 1953

2,657,010

UNITED STATES PATENT OFFICE 2,657,010

FENCE POST DRIVER AND PULLER

Walter E. Sabin and Luverne E. Sabin,
Dolliver, Iowa

Application October 2, 1950, Serial No. 187,973

16 Claims. (Cl. 254—29)

This invention relates to a new and improved apparatus for driving or pulling fence posts, whereby the operation of erecting fence posts may be quickly accomplished with a minimum of effort, and also whereby the posts may be quickly pulled out of the ground, when it is desired to shift the position of the fence or dismantle it.

An important object of the present invention is to provide an apparatus of this general type which is extremely simple and inexpensive in construction, and which embodies a supporting frame which may readily be secured to the usual frame of a conventional farm tractor, or other power propelled vehicle having a power take-off shaft so located that it may readily be connected to the operating drive shaft of the post driving apparatus to furnish the necessary power for driving fence posts into the ground or for pulling the fence posts therefrom, when the fence has served its purpose.

A further object is to provide an apparatus for driving metal fence posts such as commonly used in the construction of enclosures for farm animals, said apparatus being readily attachable to the rear end of a tractor and having means for coupling it to the usual power takeoff shaft of the tractor, and means being provided thereon for carrying a plurality of fence posts, thereby to facilitate successively erecting a series of such posts in the operation of constructing a fence.

Other objects of the invention reside in the specific construction of the frame of the apparatus, whereby said frame may be quickly secured to the frame of a tractor with the operating shaft of the apparatus positioned to be coupled to the usual power takeoff shaft of the tractor; in the construction of the cable winding mechanism which comprises a jack-shaft having a relatively large spur gear secured thereto adapted to be driven by a pinion slidably mounted upon said operating shaft, said jack-shaft being arranged to serve as a windlass or winding drum upon which the cable is wound in the operation of forcing each fence post into the ground to the desired depth; in the means provided for disengaging the fence post driven into the ground, when the apparatus is moved forwardly to the next post location; in the novel construction of the means provided for shifting the drive pinion into or out of driving engagement with the relatively larger spur gear, thereby to control the operation of the jack-shaft; in the mounting of the pressure head for engaging and forcing each post into the ground; and in the provision of an auxiliary pulley at the upper end of the supporting frame of the apparatus adapted to support a cable having one end connected to the pressure head and its other end arranged to be secured to a fence post to be pulled, whereby downward movement of the pressure head is utilized for extracting the posts from the ground as well as initially forcing them into the ground, as when erecting a fence.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 4 is a plan view of Figure 5, showing the relative position of the various parts of the fence post driver and puller;

Figure 5 is a vertical sectional view substantially on the line 5—5 of Figure 4, showing the slidable drive pinion for driving the jack-shaft;

Figure 6 is a detail sectional view substantially on the line 6—6 of Figure 5, showing the drive pinion in its inoperative position;

Figure 7 is an enlarged detail sectional view on the line 7—7 of Figure 8, showing the slidably mounted driving head for forcing the fence posts into the ground;

Figure 8 is a sectional plan view on the line 8—8 of Figure 7 showing the guide for the driving head; and Figure 9 is a detail sectional view on the line 9—9 of Figure 7.

Figure 1:
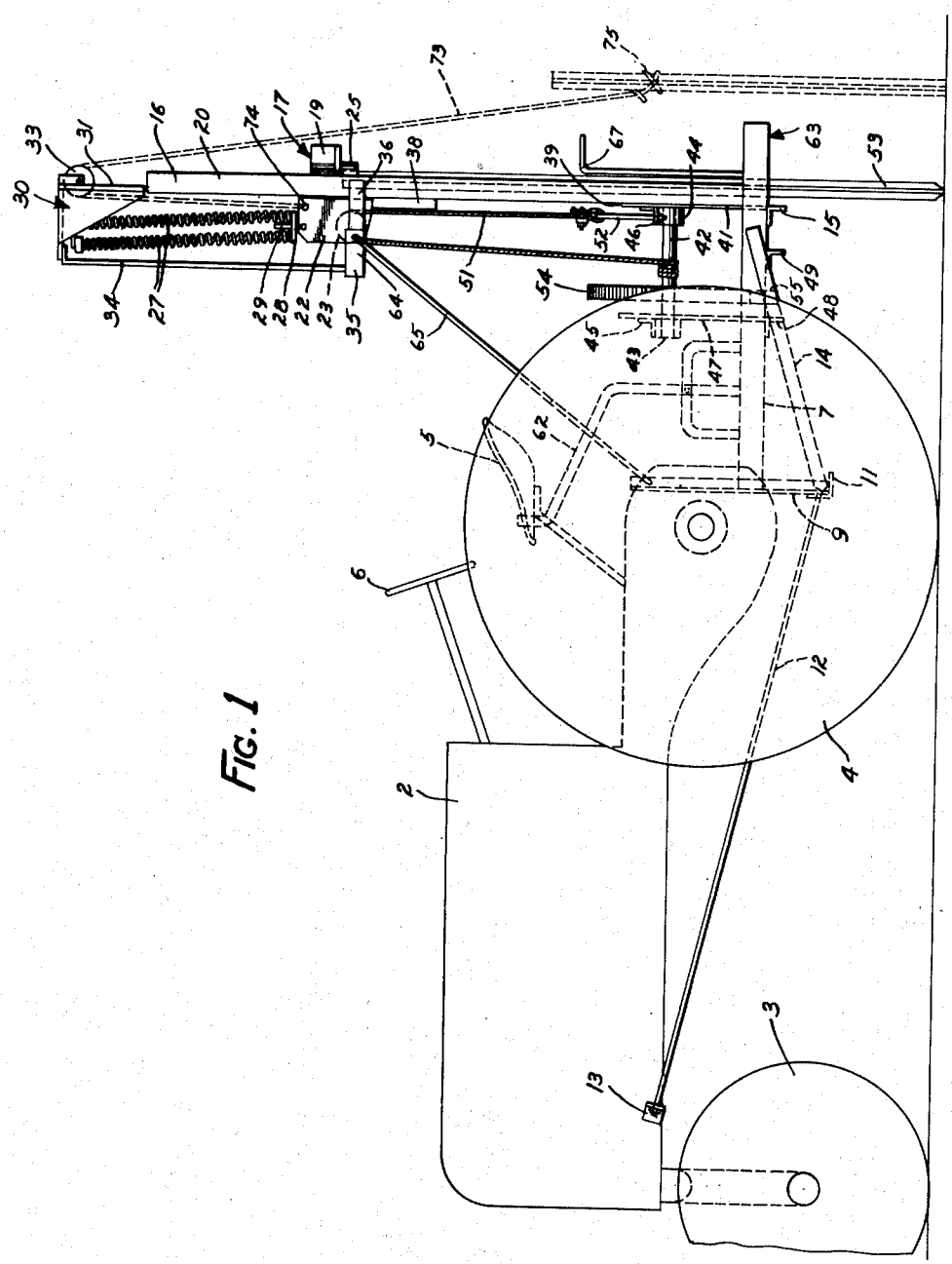
Figure 1 is a side elevation of a conventional farm tractor showing the fence post driver and puller mounted in operative position thereon, the full line position of the fence post showing it in place to be driven into the ground, and the dotted lines indicating a fence post about to be pulled from the ground.

In the selected embodiment of the invention herein disclosed, there is illustrated, for purposes of disclosure, the outline of a conventional farm tractor comprising the usual body and supporting frame 2, front wheels 3, rear wheels 4, driver's seat 5, and steering wheel 6.

The novel fence post driver and puller herein disclosed comprises a supporting frame including side members 7 and 8, having their forward ends secured to upright frame members 9 adapted to be secured to the frame of the tractor by suitable means, not shown in the drawings.

A cross member 11 is secured to the lower depending ends of the upright frame members 9 and diagonal brace rods 12 are secured to the ends of the cross member 11 and to brackets 13 provided at the forward end of the tractor body. Diagonal brackets 14 also extend rearwardly from the ends of the cross member 11 and have their rear end portions suitably secured to the upright flanges of the horizontal frame members 7 and 8, as indicated in Figure 1.

A suitable cross member 15 is also secured to the rear end portions of the side frame members 7 and 8 to provide a support for a pair of upright angle bars 16, which cooperate to provide a vertical guide for a driving head, generally designated by the numeral 17.

The angle bars 16, as will be noted by reference to Figures 6 and 8, are arranged in opposed relation and have their adjacent edges of their inwardly directed flanges spaced apart to provide a vertically disposed guide slot 18 therebetween adapted to receive a longitudinally extending web 19 of the driving head 17.

The driving head 17 is shown formed from a conventional T-bar, having portions of its horizontal flanges cut away to provide the forwardly extending bar-like web 19, as will be understood by reference to Figure 8. As here shown, the opposed side flanges 20 of the upright angle bars 16 and the slot 18 thus cooperate to provide an adequate guide for the driving head 17. Filler plates 21 are shown interposed between the forwardly extending web 19 and a pair of upright metallic plates 22 and all of these parts are secured together in flatwise relation by suitable means, not shown in the drawings. The upper ends of the side plates 22 are shown extending above the upper edge of the web 19, and the lower ends of said plates extend a substantial distance below the bottom edge of the web 19 to provide a support for a pulley 23.

The pulley 23 is mounted on a pin or bolt 24 having its terminals supported in the depending end portions of the side plates 22, as will be understood by reference to Figures 7 and 9. An inverted cup-shaped member 25, is shown secured to the bottom or horizontally disposed web of the driving head 17 adapted to receive the upper end of a post to be driven or forced into the ground, as will subsequently be described.

To prevent the driving head 17 from binding in its guide, the edges 26 of the spaced plates 22 may be arranged to slidably engage the adjacent faces of the angle irons 16, as will be understood by reference to Figures 7 and 8, whereby the head 17 cannot calk or tilt in its guide, when a downward pull is exerted thereon in the operation of forcing a fence post into the ground, or withdrawing one therefrom.

The driving head 17 is normally retained in its upper position by spring means, here shown comprising a pair of tension springs 27 having their lower ends secured to an anchor bar 28 which, in turn, is secured to the driving head 17 by an I-bolt 29, having its lower end secured to the driving head and its upper threaded end portion adjustably secured to the anchor bar or member 28, as will be clearly understood by reference to Figure 7. The upper ends of the springs are suitably anchored or fixed to a top member, generally designated by the numeral 30. The member 30 is shown comprising an upright portion 31 secured to the upper ends of the angles 16 by such means as bolts 32, or, if desired, it may be welded to the angles 16. The member 30 provides a support for an auxiliary pulley 33, utilized only when the apparatus is to be used for pulling a fence post out of the ground.

A guard 34 has its upper end secured to the member 30 and its lower end to the intermediate portion of a U-shaped member 35 secured to the upright guide-forming angle bars 16 by spaced bars 36. These bars may have their rear end portions welded to the angle bars 16, and the forward ends thereof may be secured to the U-shaped member 35 by such means as bolts 37. If desired, the bars 36 may be formed from a single piece of strap metal, bent to form a U-shaped member having its central portion secured to the member 35, as will be clearly understood by reference to Figure 8.

Figure 2:
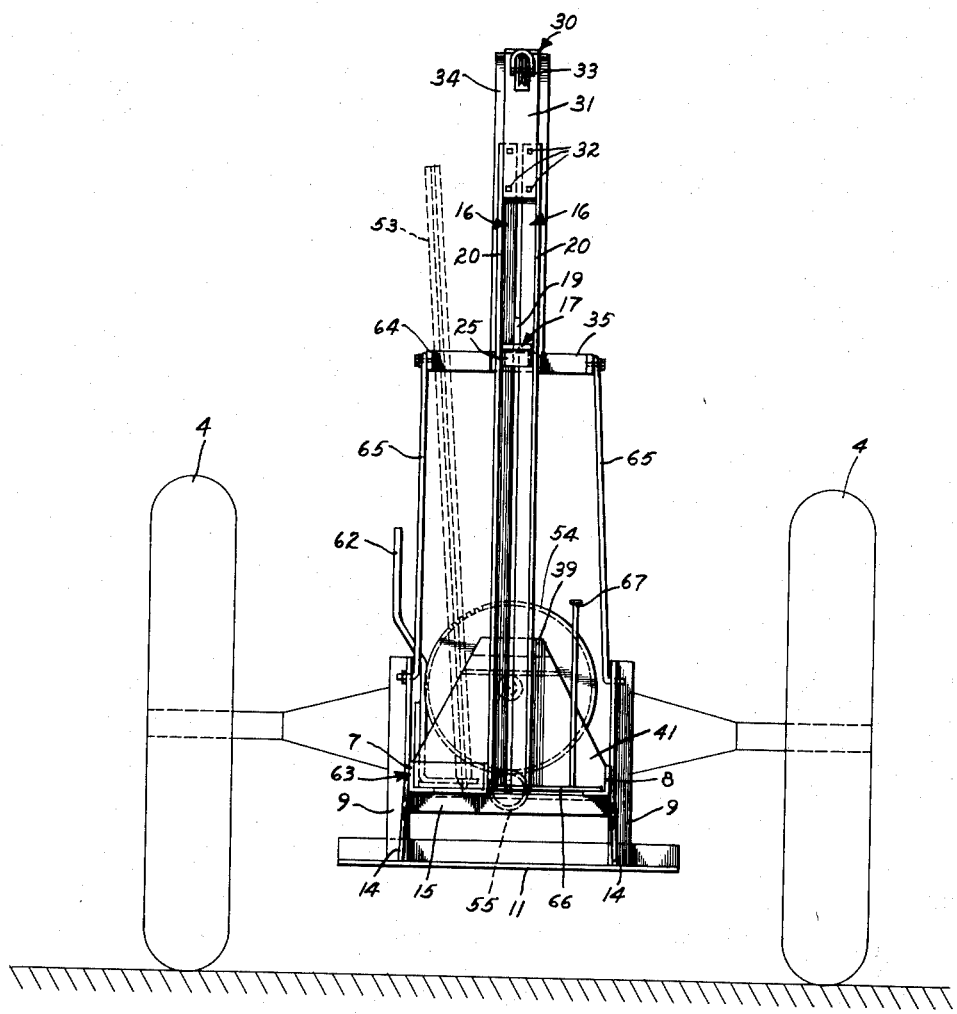
Figure 2 is an end view of Figure 1 looking at the apparatus from a position rearwardly of the tractor.
Figure 3:
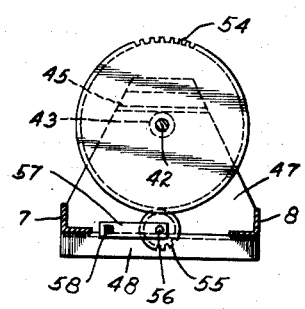
Figure 3 is an enlarged fragmentary sectional view on the line 3—3 of Figure 5; showing the driving connection between the power take-off shaft and the jack-shaft.

A depending bar 38, preferably T-shaped in cross-section, is shown having its upper end suitably secured to the lower portion of the driving head 17, and has its lower end arranged to engage the upper edge 39 of a gusset plate 41 which constitutes a portion of the supporting frame of the post driver and puller. By referring to Figures 2 and 3, it will be noted that the plate 41, which may be substantially triangular in configuration, has its lower edge portion suitably secured to the side frame members 7 and 8 and to the cross member 15, and extends upwardly therefrom, and is suitably secured to the inwardly extending webs of the angle irons 16 constituting the guide for the driving head 17. If desired, the member 38 and upper edge 39 of the plate 41 may be utilized as a limit stop for the downward movement of the driving head 17 in its guide.

The means provided for moving the driving head downwardly in its guide to force a fence post into the ground or withdraw one therefrom, is shown comprising a jack shaft 42 mounted in suitable bearings 43 and 44 in the machine frame. These bearings may be similar in construction, and are shown secured to angle iron brackets 45 and 46, secured respectively to an upright plate element 47 and the plate element 41. The contour of plate element 47 may be similar to the contour of the plate element 41, as will be understood by reference to Figures 2 and 3. Suitable cross angles 48 and 49, similar to angle iron 15, have their ends suitably secured to the side frame members 7 and 8, as will be understood by reference to Figures 1 and 5.

A cable 51 is shown having one end suitably anchored to the angle bracket 46 by a suitable U-shaped attaching member 52. From the U-shaped member 52, the cable passes over the pulley 23 in the driving head 17 and has its other end wrapped around the jack shaft 42 and suitably anchored thereto. Thus, when the jack-shaft 42 is rotated, the driving head 17 is moved downwardly in its guide by the force applied thereto by the cable 51. Cable 51 thus is utilized downwardly to translate the driving head 17 in its guide in the operation of forcing a fence post into the ground or pulling one therefrom.

The means provided for rotating the jack-shaft 42 comprises a spur gear 54 secured to the jack-shaft, and arranged to be driven by a pinion 55, slidably mounted on a drive shaft 56 having its forward end suitably coupled to the power take-off shaft of the tractor, by means not shown in the drawings.

The pinion 55 is supported between spaced parallel arms 57 having their opposite ends secured to a bar or shaft 58 mounted for sliding movement in suitable guides 59 and 61, the latter being formed by an aperture provided in the lower marginal edge of the gusset plate 47. By thus supporting the bar or shaft 58, it may be axially moved in its guides to shift the drive pinion 55 into or out of driving engagement with the spur gear 54, thereby to control the operation of the driving head 17. A shift lever 62, shown in full lines in Figure 2, and dotted lines in Figure 1, is provided for shifting the pinion 55 into and out of driving engagement with the gear 54.

By referring to Figures 4, 5 and 6, it will be noted that a portion of the supporting frame of the post driver extends rearwardly of the upright guide angles 16. This rearwardly extending frame portion, generally indicated by the numeral 63, constitutes a platform to accommodate an operator or attendant, or it may be utilized for supporting a plurality of fence posts in readiness to be forced into the ground. The fence posts supported on the platform 63 have their upper ends received between the rearwardly extending arm portion 64 of the U-shaped member 35 and the adjacent bar 36, shown in Figure 8. Suitable brace rods 65 are shown having their ends secured respectively to the upright frame members 9 and the rear terminals of the arms of the U-shaped member 35 to further support the apparatus on the tractor.

A horizontally disposed arm or member 66 is shown having one end pivoted to the rearwardly extending end portion of the side frame member 8, and has its opposite end arranged to be swung to a position adjacent to the lower end of the guide formed by the opposed angle irons 16, thereby to retain the lower portion of the fence post 53 in the guide. The upper end of a fence post about to be driven into the ground is received in the inverted cup-shaped element 25 of the driving head, whereby the fence post is retained in an upright position while being forced into the ground.

With the puller herein disclosed, it is necessary to momentarily interrupt the movement of the tractor while forcing a fence post into the ground. As soon as it has been driven home, the tractor may advance to the next post location. Should the attendant or operator stationed on the platform 63 inadvertently fail to manually swing the arm 66 to its inoperative position, indicated by the dotted lines in Figure 4 and full lines in Figure 6, said arm will be automatically swung out of engagement with the fixed fence post, as the tractor advances to the next post location.

It will thus be seen that the operation of erecting a series of fence posts with the novel apparatus herein disclosed may be expeditiously effected with a minimum of effort and labor. The operator stationed on the platform 63 places a fence post in the guide each time the traction advances to the next location, whereby the operation of forcing each successive post into the ground may be accomplished without waste of time and with the assurance each fence post will be properly driven into the ground. The operation of the driving head 17 is controlled by the driver of the tractor by simply manipulating the lever 62 to shift the pinion 55 into driving engagement with the gear 54, each time the tractor comes to rest at a post location.

To facilitate swinging the arm 66 out of engagement with the fence post, a suitable lever 67 is secured to the arm 66, whereby the operator stationed on the platform 63 may readily swing the arm to its inoperative position, shown in Figure 6. A spring 68 is operatively connected to the arm 66 and effects an over-the-center action to said arm, whereby the spring will retain said arm in either its operative position, shown in full lines in Figure 4, or its inoperative position, indicated in dotted lines in said figure.

To facilitate supporting the lower end portion of the fence post in the guide formed by the flanges 16, locating elements 69 and 71 are provided in the guide 16 having their ends spaced apart to provide a recess 72 adapted to receive one of the flanges of the post, as will be clearly understood by reference to Figures 4 and 6.

If it is desired to pull a fence post out of the ground, an auxiliary cable 73 has one end secured to the driving head 17, as indicated at 74 in Figure 1, and from the head 17, said cable passes upwardly over the pulley 33, and has its free end secured to the fence post, as indicated at 75. The jack-shaft 42 is then operated to pull the driving head 17 downwardly in its guide. Such downward movement of the head will exert an upward pull on the fence post through the cable 73, whereby the fence post may readily be pulled out of the ground without difficulty. When a post has thus been pulled out of the ground, it is released from the cable 73 and may be placed on the platform 63, or thrown to one side, as may be desired.

From the foregoing, it will be noted that the novel apparatus herein disclosed provides a very simple and efficient apparatus for economically driving metallic fence posts into the ground or withdrawing them therefrom. To erect a new fence, the path of the fence is first determined, and the operator of the tractor then simply follows the proposed line of the fence. This may readily be accomplished because the fence post driving means is located in the center of the truck, as may be noted by reference to Figures 2 and 4.

By utilizing a jack shaft 42, as a winding drum for the cable 51, the desired speed reduction between the drive shaft 56 and the downward movement of the driving head 17 is readily obtained with a minimum number of moving parts. The resultant structure also presents the utmost in simplicity and ease of operation. The lifting head is constantly urged upwardly in its guide by the springs 27, whereby when the drive pinion 55 is disengaged from the gear 54, the driving head is returned to its normal elevated position adjacent the upper end of the guide.

The foregoing detailed description has been given for clearness of understanding only, and no unnecessary limitations should be understood therefrom, but the appended claims should be construed as broadly as permissible in view of the prior art.

We claim as our invention:

1. In a fence post driver and puller adapted for use in connection with a power propelled vehicle having a power takeoff shaft, a supporting frame having means at its forward end for mounting it on the power vehicle, an upright slideway on said frame, a driving head slidably mounted in said slideway and having means thereon extending in a direction congruent with the longitudinal axis of said vehicle for engaging the top of a fence post, spring means normally retaining the driving head in an elevated position in said slideway, a flexible cable having a running connection with said head, and disengageable gear means for drivingly connecting said cable to the power takeoff shaft of the vehicle, thereby to downwardly translate the driving head in the guide to force a fence post into the ground.

2. A fence post driver puller in accordance with claim 1, wherein the gear means for downwardly moving the driving head in its guide comprises a jack-shaft having means for operatively connecting it to the power takeoff shaft of the tractor, and a flexible cable having one end anchored to the machine frame and having a running connection with the driving head, the opposite end of said cable being wound about the jack shaft whereby the latter may serve as a winding drum for the cable, when the driving head is vertically moved in its guide in the operation of forcing a fence post into the ground.

3. A fence post driver and puller in accordance with claim 1, wherein means is provided in the lower portion of the guide for retaining a fence post resiliently and slidably therein while said head is forcing it into the ground.

4. A fence post driver and puller in accordance with claim 3, wherein the means for retaining the lower portion of the fence post in the guide while driving it into the ground consists of a pivoted lever having means for retaining it in either operative or inoperative position.

5. In a fence post driver and puller adapted for use in connection with a tractor having a power takeoff shaft, a supporting frame having means at its forward end for mounting it upon the frame of the tractor, said supporting frame comprising an upright guide in which the fence post to be driven into the ground is slidably supported and guided in its downward movement, a driving head slidably mounted in said guide and having an inverted cup-shaped member for receiving the upper end of the fence post, a jack-shaft having a gear wheel secured thereto, a cable having one end secured to said supporting frame and having a running connection with said driving head, the opposite end of said cable being wound about said jack-shaft whereby said shaft may serve as a winding drum, a drive pinion operatively connected to the power takeoff shaft of the tractor for direct rotation therewith, and means whereby said drive pinion is selectively movable into or out of driving engagement with said gear to control the operation of the driving head.

6. A fence post driver and puller in accordance with claim 5, wherein means is provided in cooperation with the movement of said driving head for pulling a fence post out of the ground.

7. A fence post driver and puller in accordance with claim 5, wherein the means for pulling a fence post comprises a sheave mounted at the upper end of said guide at an elevation above the normal inoperative position of the driving head, and an auxiliary cable having one end secured to the driving head and having a running connection with said sheave and having its opposite end arranged to be secured to the fence post to be pulled out of the ground, whereby when the driving head is moved downwardly in said guide, by rotation of the jack shaft, the auxiliary cable will exert an upward pull on the fence post to withdraw it from the ground.

8. A fence post driver and puller in accordance with claim 5, wherein a pivoted element is provided at the lower end of the guide for slidably retaining the post to be driven into the ground in position therein.

9. A fence post driver and puller in accordance with claim 5, wherein a platform is provided adjacent to said guide for accommodating a plurality of fence posts to be driven into the ground and to facilitate the operation of placing the fence posts in said guide by an operator stationed on said platform.

10. A fence post driver and puller adapted for use in connection with a tractor having a power take-off shaft, comprising a supporting frame positioned between the wheels of said tractor having its forward end fixedly secured to the rear thereof, bracing members securing said frame to said tractor, a vertical slideway comprising two spaced angle members each having a flange directed toward the other attached to said frame and extending upwardly therefrom, a driving head slidably mounted in said slideway comprising a horizontal member and a vertical web, an inverted cup-shaped member for receiving the upper end of a fence post to be driven attached to the underside of said horizontal member, said horizontal member having one edge which abuts the flanges of the two spaced angle members which are directed toward each other, said vertical web secured to said horizontal member and extending between said flanges, a coil spring means anchored at one end to the top of said vertical slideway and at the other end to said vertical web, a sheave carried by said vertical web, a flexible cable having one end anchored adjacent a lower portion of said slideway having the intermediate portion thereof passed over said sheave, the other end of said cable being anchored to a jack-shaft supported on said frame, a spur gear positioned on said jack-shaft with the axis of said spur gear parallel to the longitudinal axis of said tractor, a drive pinion operatively connected to the power take-off shaft of the tractor for direct rotation therewith, said drive pinion being supported by a longitudinally movable shaft and lever means for longitudinally moving said shaft whereby said pinion may be engaged or disengaged from said spur gear for the actuation of said driving head.

11. The apparatus of claim 10 further characterized by a pair of cooperating members positioned at the bottom of said frame, said members being spaced apart a distance sufficient to admit one flange of a conventional fence post to be driven, and a keeper resiliently mounted to constantly urge said post against said spacing members for maintaining said flange therebetween, said keeper being positioned for pivotal movement from a first position constantly engaging said post to a second out-of-the-way position, said resilient means being of sufficient strength whereby as the tractor is moved forward after the post has been driven into the ground the post will automatically move said keeper from said first position to said second position.

12. The apparatus of claim 10 further characterized by means provided in cooperation with the downward movement of said driving head for pulling a fence post out of the ground.

13. A fence post driver and puller adapted for use in connection with a tractor having a power take-off shaft, comprising a supporting frame having its forward end fixedly secured to the rear of said tractor, said frame being positioned between the rear wheels of said tractor, a vertical slideway comprising two spaced members attached to said frame and extending upwardly therefrom, a driving head slidably mounted in said slideway comprising a horizontal member and means for receiving the upper end of a fence post to be driven attached thereto, said horizontal member having one edge of which abuts the two spaced members, a vertical web secured to said horizontal member, said vertical web extending between said spaced members, a coil spring means anchored at one end adjacent the top of said vertical slideway and at the other end to said driving head, a flexible cable connection between said head and a jack-shaft supported on said frame, and means for connecting said jack-shaft to the power takeoff of said tractor for rotation therewith.

14. A fence post driver and puller adapted for use in connection with a tractor having a power take-off shaft, comprising a supporting frame having its forward end fixedly secured to the rear of said tractor, said frame being positioned between the rear wheels of said tractor, a vertical slideway comprising two spaced members attached to said frame and extending upwardly therefrom, a driving head slidably mounted in said slideway comprising a horizontal member and means for receiving the upper end of a fence post to be driven attached thereto, said horizontal member having one edge of which abuts the two spaced members, a vertical web secured to said horizontal member, said vertical web extending between said spaced members, a coil spring means anchored at one end adjacent the top of said vertical slideway and at the other end to said driving head, a flexible cable connection between said head and a jack-shaft supported on said frame, a spur gear positioned on said jack-shaft, a drive pinion operatively connected to the power take-off shaft of the tractor for direct rotation therewith, said drive pinion being supported by a longitudinally movable shaft and lever means for longitudinally moving said shaft whereby said pinion may be engaged or disengaged from said spur gear for the actuation of said driving head.

15. The apparatus of claim 14 further characterized by a pair of cooperating members positioned at the bottom of said frame, said members being spaced apart a distance sufficient to admit one flange of a conventional fence post to be driven, and a keeper resiliently mounted to constantly urge said post against said spacing members for maintaining said flange therebetween, said keeper being positioned for pivotal movement from a first position constantly engaging said post to a second out-of-the-way position, said resilient means being of sufficient strength whereby the tractor is moved forward after the post has been driven into the ground, the post will automatically move said keeper out from said first position to said second position.

16. In a fence post driver and puller adapted for use in connection with a power propelled vehicle having a power take-off shaft, a supporting frame having means at its forward end for mounting it on the power vehicle, an upright slideway on said frame, a driving head slidably mounted in said slideway and having means thereon extending in a direction congruent with the longitudinal axis of said vehicle for engaging the top of a fence post, means normally retaining the driving head in an elevated position in said slideway, a flexible cable connecting said driving head to a disengageable gear means for drivingly connecting said cable to the power take-off shaft of the vehicle thereby to downwardly translate the driving head and the guide to force the fence post into the ground.

WALTER E. SABIN.
LUVERNE E. SABIN.

References Cited in the file of this patent
UNITED STATES PATENTS

| Number | Name | Date |
| --- | --- | --- |
| 2,435,651 | Huber | Feb. 10, 1948 |
| 2,456,852 | Anderson | Dec. 21, 1948 |
| 2,551,896 | Notestein | May 8, 1951 |